(12) United States Patent
Vogel (10) Patent No.: US 9,517,402 B1
(45) Date of Patent: Dec. 13, 2016

(54) SYSTEM AND METHOD FOR UNIQUELY IDENTIFYING PLAYERS IN COMPUTER GAMES BASED ON BEHAVIOR AND OTHER CHARACTERISTICS

(71) Applicant: Epic Games, Inc., Cary, NC (US)

(72) Inventor: Daniel Vogel, Cary, NC (US)

(73) Assignee: EPIC GAMES, INC., Cary, NC (US)

( * ) Notice: Subject to any disclaimer, the term of this patent is extended or adjusted under 35 U.S.C. 154(b) by 312 days.

(21) Appl. No.: 14/132,172

(22) Filed: Dec. 18, 2013

(51) Int. Cl.
| | |
|---|---|
| A63F 9/24 | (2006.01) |
| A63F 13/00 | (2014.01) |
| G06F 21/31 | (2013.01) |
| A63F 13/75 | (2014.01) |
| H04L 29/06 | (2006.01) |

(52) U.S. Cl.
CPC .............. *A63F 13/00* (2013.01); *A63F 13/75* (2014.09); *G06F 21/316* (2013.01); *H04L 63/1483* (2013.01); *A63F 2300/5586* (2013.01)

(58) Field of Classification Search
CPC . G06F 21/316; A63F 13/75; A63F 2300/5586
See application file for complete search history.

(56) References Cited

U.S. PATENT DOCUMENTS

| | | | | |
|---|---|---|---|---|
| 5,909,589 A * | 6/1999 | Parker | .................... | G09B 5/065 |
| | | | | 712/32 |
| 8,051,468 B2 * | 11/2011 | Davis | ...................... | G06F 21/32 |
| | | | | 713/186 |
| 8,225,413 B1 * | 7/2012 | De | ........................ | G06F 21/316 |
| | | | | 726/22 |
| 8,370,389 B1 * | 2/2013 | Dotan | ..................... | A63F 13/12 |
| | | | | 707/781 |
| 8,819,769 B1 * | 8/2014 | van Dijk | ............. | H04L 63/0876 |
| | | | | 726/1 |
| 8,856,922 B2 * | 10/2014 | Rubinstein | .......... | H04L 63/1483 |
| | | | | 726/22 |
| 8,875,267 B1 * | 10/2014 | Kolman | .................. | G06F 21/31 |
| | | | | 709/203 |
| 2002/0130835 A1 * | 9/2002 | Brosnan | ................ | G06F 1/1626 |
| | | | | 345/156 |
| 2003/0126471 A1 * | 7/2003 | Hillis | .................... | G06F 21/316 |
| | | | | 726/21 |

(Continued)

*Primary Examiner* — Steven J Hylinski
(74) *Attorney, Agent, or Firm* — Hunton & Williams LLP (57) ABSTRACT

Various exemplary embodiments of the present invention uniquely identify players in a video game based on how a player interacts with a game and/or other players to generate a unique player identifier or player fingerprint. The player may also be categorized by player data or category to identify certain behavior (e.g., fraud). This unique information may be used to accurately authenticate the player to address fraud and other situations involving an unauthorized player. By verifying the identity of the player, an embodiment of the present invention may detect, minimize and/or prevent fraud and/or other situations where someone else is improperly playing or accessing another player's account. Authentication of player identity can also be used to detect cheating, improper sale of accounts, and other undesirable player behavior. Player fingerprint information may also be used to tailor information to the player (e.g., suggestions for other games, advertisements, instructional information, etc.).

16 Claims, 3 Drawing Sheets

(56) References Cited

U.S. PATENT DOCUMENTS

| | | | |
|---|---|---|---|
| 2007/0271466 A1* | 11/2007 | Mak | G06F 21/316 713/184 |
| 2008/0028231 A1* | 1/2008 | Bender | G06F 21/316 713/186 |
| 2008/0059474 A1* | 3/2008 | Lim | G06F 17/3089 |
| 2008/0098456 A1* | 4/2008 | Alward | G06F 21/316 726/1 |
| 2008/0115213 A1* | 5/2008 | Bhatt | G06F 21/316 726/22 |
| 2009/0083847 A1* | 3/2009 | Fadell | G06F 21/316 726/16 |
| 2009/0189791 A1* | 7/2009 | Brinton | G06F 21/316 341/22 |
| 2010/0115114 A1* | 5/2010 | Headley | G10L 17/22 709/229 |
| 2010/0169659 A1* | 7/2010 | Shnowske | A63F 13/12 713/183 |
| 2011/0016534 A1* | 1/2011 | Jakobsson | G06F 21/316 726/28 |
| 2011/0276689 A1* | 11/2011 | Rosen | G06F 17/3087 709/224 |
| 2012/0079576 A1* | 3/2012 | Han | G06F 21/316 726/7 |
| 2012/0185916 A1* | 7/2012 | Chae | G06F 21/316 726/2 |
| 2013/0054433 A1* | 2/2013 | Giard | H04L 67/22 705/34 |
| 2013/0104203 A1* | 4/2013 | Davis | H04L 9/3231 726/5 |
| 2013/0167207 A1* | 6/2013 | Davis | G06F 21/316 726/5 |
| 2013/0191908 A1* | 7/2013 | Klein | G06F 21/36 726/18 |
| 2014/0237570 A1* | 8/2014 | Shishkov | G06F 21/316 726/7 |
| 2015/0261945 A1* | 9/2015 | Johansson | G06F 21/316 726/7 |
| 2015/0271166 A1* | 9/2015 | Paxton | G06F 21/316 726/2 |

* cited by examiner

SYSTEM AND METHOD FOR UNIQUELY IDENTIFYING PLAYERS IN COMPUTER GAMES BASED ON BEHAVIOR AND OTHER CHARACTERISTICS

FIELD OF THE DISCLOSURE

Exemplary embodiments of the present invention relate generally to identifying players in a computer game, and more specifically to a system and method for uniquely identifying players based on a player's game behavior and/or other player characteristics and also identifying players based on behavior, pattern, category and/or other information.

BACKGROUND OF THE DISCLOSURE

As online games become more popular and easily accessible, players are devising new ways to commit fraud and engage in other undesirable behavior during a game. This type of behavior has an adverse effect on the gaming environment and also creates an unbalanced playing field. For example, cheaters are able to out-perform the game by improperly gaining an advantage thereby resulting in unfairness to other players and an unbalanced playing economy. As a result, once loyal garners get frustrated and leave the game. Other forms of undesirable behavior include account hacking and sale of accounts and/or other assets improperly obtained. A game provider may lose loyal garners and also suffer in reputation. These various forms of cheating and fraud, in most cases, are hard to detect and even more difficult to prevent.

These and other drawbacks exist.

SUMMARY OF THE DISCLOSURE

Various exemplary embodiments of the present invention uniquely identify players in a video game based on how a player interacts with a game and/or other players to generate a unique player identifier or player fingerprint. This unique information may be used to accurately authenticate the player to address fraud and other situations involving an unauthorized player and/or improper player activity.

An exemplary embodiment includes a computer implemented method with the following steps: identifying a unique player identifier for at least one player of a computer game; collecting game behavior data relating to behavior of at least one player during the computer game; performing a comparison between the unique player identifier and the game behavior data; determining player authentication based at least in part on the comparison; and providing a recommended action responsive to the comparison.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

DETAILED DESCRIPTION OF EXEMPLARY EMBODIMENT(S)

The following description is intended to convey a thorough understanding of the embodiments described by providing a number of specific embodiments and details involving systems and methods for uniquely identifying players in a video game based on a player's game behavior characteristics and/or other player information. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Exemplary embodiments are directed to systems and methods for uniquely identifying players based on a player's specific behavior characteristics. For example, this identification information may serve as a fingerprint (or other unique identifier or unique pattern) for the player. A player may also be identified by behavior (e.g., bucketing of player behavior). For example, a player may be identified by player data (e.g., category, pattern, etc.) to identify certain behavior (e.g., fraud, account hacking, etc.). The fingerprint may be used to authenticate the player. By verifying the identity of the player, an embodiment of the present invention may detect, minimize and/or prevent fraud and/or other situations where someone else is improperly playing or accessing another player's account. Authentication of player identity can also be used to detect cheating, improper sale of accounts, and other undesirable player behavior. Player fingerprint information may also be used to tailor information to the player (e.g., suggestions for other games, advertisements, instructional information, etc.).

An embodiment of the present invention accurately and uniquely identifies a player, even in cases where login credentials are shared. To this end, the player may be uniquely identified by the player's characteristics, rather than information that is received as a user input. For cheat detection, radical changes in player behavior can be identified. This can be used to identify known cheaters as well the existence of a cheater that may be unknown to the game creator/author. Also, if a player is identified as sharing the same (or similar) fingerprint or same (or similar) player behavior as another player, an embodiment of the present invention may identify this player as potentially engaging in improper behavior (e.g., this behavior may be indicative of a cheat).

According to another example, a player's unique identification may be used to distinguish automated players (e.g., bots) from actual players. An embodiment of the present invention may be used to prevent automated players from outplaying or outlasting actual players. For example, automated players may attempt to unfairly hoard resources in a game (e.g., gold farming which can ruin a game's economy). Automated players may also be programmed to perform steps at a high repetition rate to engage in unfair gameplay. Accordingly, by uniquely identifying a player, an embodiment of the present invention may improve gameplay for other players by keeping the game environment on a level and fair field. Also, an embodiment of the present invention may identify the use of cheats, bots and/or other improper game play (e.g., fully automated, partially automated, player assisted, etc.) by grouping or bucketing behavior (e.g., identifying a high repetition rate, discrete time intervals between actions, etc.).

Exemplary embodiments may be used by game providers (e.g., computer gaming company, online gaming company, etc.), law enforcement agencies and/or other entities. For example, garners may be discouraged from playing in certain games that are known for engaging cheaters and/or unfair game practices. As a result, a game provider may lose players and thereby suffer in reputation. When cheaters engage in fraudulent behavior through account hacking, law enforcements and/or a fraud agency or group may be alerted.

Other forms of fraud may include account compromises, stealing security codes/answers, etc. Fraud may also include improper sale activities, such as sale of accounts, which may be against an End User License Agreement (EULA).

A player may be uniquely identified based on player game characteristics (e.g., how the player plays the game), which may include player behavior or pattern. For example, target acquisition patterns, time from on-screen to reaction, pattern of mouse honing in to target, pattern of body part being targeted, fire patterns, time between bursts, offset from target when first shot is fired, movement patterns, interplay of rotation and movement, rarely moving backwards or looking up, location patterns, hugging walls vs. not hugging walls, taking the same route through a level, jump start point, time to orient after re-spawn, interaction with other players, Voice Over Internet Protocol (VoIP) usage, timing patterns can each be used, either separately or in combination. Also, gameplay characteristics may be generalized for types of games (e.g., target games, combat games, single player games, multiplayer games, etc.).

The unique identifier (or unique pattern) may include other forms of information in addition to the gameplay characteristics. Other information may include behavior information, player demographics, social network information, transaction information, purchase information and/or other types of data. Behavior information may include when a player engages in a game or games in general (e.g., time of day, time of week, pattern of gameplay, etc.), who the player plays with or against, whether the player plays with or against random players or the same group of players, how long a player plays a game (or games), types of games, etc. Demographic information may include age, gender, residence location, current location, ethnicity, profession, education, job, income, spend level, life style, type of gamer, etc. Current location and known location information may be analyzed. For example, it may be determined that a player is playing a game from a location in New York. The system may determine that the player checked-in at a location in California within a few hours. The system may recognize that the location data is not consistent, implausible and/or highly unlikely. This may also apply to a purchase transaction used with a credit card or other payment instrument associated with the player. In other words, an embodiment of the present invention may recognize that it would be impossible (or highly unlikely) for a person to play a game from New York and within 2 hours, engage in an activity or an in-person transaction in California.

Other sources of information may include social networking websites, image aggregators, data aggregators, card transactions, purchase history, activity at affiliate companies, etc. Information from social networking websites may also include activity on personal pages (e.g., likes, comments, purchases, shares, etc.), who or what the player follows, etc. Other information may include participation in trade shows, online and other communities, associations, subscriptions to newsfeeds, and/or other player activity. Purchase and transaction information which may be related or unrelated to games may be considered as well.

The unique identifier or pattern may be applied to various uses and scenarios. For example, an embodiment of the present invention may apply talent spotting to identify players with unique abilities, performance at a high skill level and/or other attribute.

The behavior can be recorded, either at the server side, client side, or both. The behavior can be condensed into a discrete data set in order to create a unique identification. Other forms or configurations of data may be used to identify the player. For example, the unique identifier may be a series of information that form a unique pattern (e.g., player fingerprint). Each category of information may be assigned a number or a grade where the combination of the number or grade forms a unique identifier. The unique identifier may be represented as a graphical map or pattern where each section is representative of an individualized score in a particular category. Other forms of identification may be applied.

Figure 1:
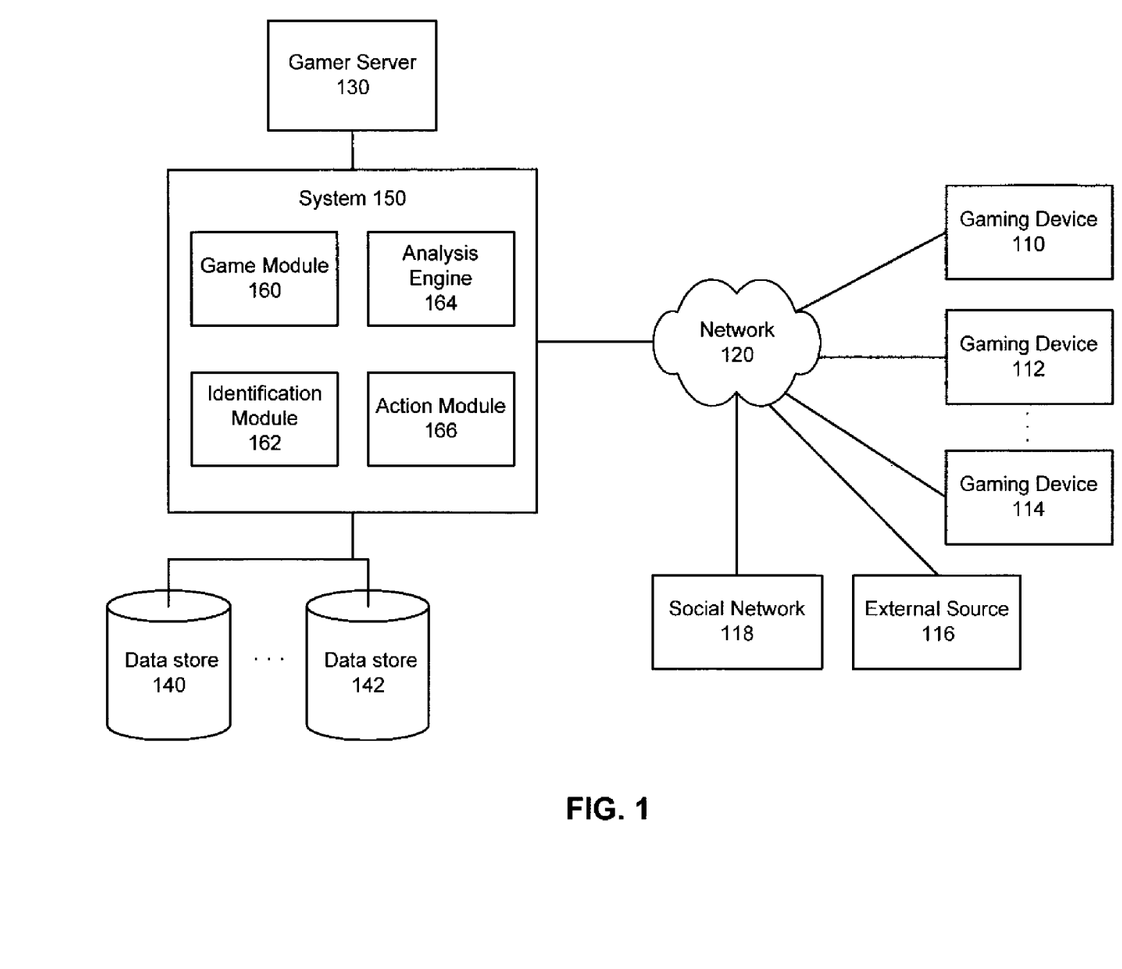
FIG. 1 is an exemplary diagram of a system for uniquely identifying a player in accordance with an exemplary embodiment.

FIG. 1 is an exemplary diagram of a system for uniquely identifying a player in accordance with an exemplary embodiment. FIG. 1 illustrates a block diagram of hardware components for unique player identification. The system may include Gaming Devices, represented by 110, 112, 114, External Source 116, Social Network 118, Game Server 130, Databases 140, 142 and System 150. System 150 may communicate with players and other entities via Network 120. In various embodiments, the term "game" or "client" may refer to the software product a person is using. In various embodiments, the term "game server" may refer to the networked computer or groups of computers that process and provide a game event. In various embodiments, the term "social network" may refer to the media, software, systems, and networks that allow users to interact socially.

Game Server 130 and System 150 may each include a network-enabled computer system and/or devices. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a game server, a gaming console, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to player identification, as described herein.

System 150 may also contain data storage for storing and tracking gameplay data, and/or other player data, for example, as represented by Data Store 140, 142. Data storage may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage may be a database, such as an Oracle database, a Microsoft SQL Server database, a DB2 database, a MySQL database, a Sybase database, an object oriented database, a hierarchical database, a NoSQL type database, or other database, Data storage may also utilize flat file structures for storage of data. While each data store is illustrated as a single component in the exemplary figure, the system may include a single consolidated data store or multiple data stores at the same location or distributed across multiple locations.

Network 120 may be one or more of a wireless network, a wired network or any combination of wireless network and wired network. For example, Network 120 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, Network 120 may include, without limitation, telephone lines, fiber optics, IEEE Ethernet 902.3, a wide area network ("WAN"), a local area network ("LAN"), or a global network such as the Internet. Also, Network 120 may support an Internet network, a wireless communication network, a cellular network, or the like, or any combination thereof. Network 120 may further include one network, or any number of the exemplary types of networks mentioned above, operating as a stand-alone network or in cooperation with each other. Network 120 may utilize one or more protocols of one or more network elements to which they are communicatively coupled. Network 120 may translate to or from other protocols to one or more protocols of network devices. Although Network 120 is depicted as a single network, it should be appreciated that according to one or more embodiments, Network 120 may comprise a plurality of interconnected networks, such as, for example, the Internet, a service provider's network, a cable television network, corporate networks, and home networks.

System 150 may include various modules to perform the functions described herein. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

As shown in FIG. 1, System 150 may include Game Module 160, Identification Module 162, Analysis Engine 164 and Action Module 166. System 150 may also include various hardware and software components for connecting to and interacting with Social Network 118.

As shown in FIG. 1, Game Server 130 may connect to System 150 via a network connection where Game Server 130 may provide the functionality described in System 150 as a consolidated entity. Also, System 150 may be separate and distinct from Gamer Server 130. For example, System 150 may be associated with a third party provider. In addition, System 150 may access player information from multiple games as well as multiple game providers. In this example, a game provider may agree to share player information with another game provider. This provides a more comprehensive data set for a player. Also, other types of data may be shared with other entities, such as a financial institution or a merchant, where transaction information may be used to further enhance the player's fingerprint. The data shared across game providers may be at a higher level of detail than the player data used internally by the game provider. In other words, a game provider may agree to share high level player game information (e.g., player's preferred game) but retain player specific game information for internal use (e.g., player's preferred weapon, etc.).

Game Module 160 may include various hardware and software components for participating in gameplay, monitoring gameplay, calculating gameplay scores, and/or all other gameplay-related activities. According to another example, System 150 may connect to Game Server 130 where Game Server 130 may provide functionality associated with Game Module 160 and transmit the collected data to System 150.

Identification Module 162 may include various hardware and software components for generating and/or updating a player's unique identification (e.g., player fingerprint, pattern) based on player behavior information and/or other data.

Analysis Engine 164 may include various hardware and software components for analyzing collected data to verify player identity. Analysis Engine may also include a prediction functionality that may take a known fraudulent event, analyze the historical data that lead to the fraudulent event and use the historical data to predict similar behavior that could lead to fraudulent activities. Analysis Engine may also perform a risk analysis to determine how likely it is for a particular player to commit fraud, cheat, etc. This analysis may be based on historical data, analysis from known fraudulent events and/or risk analysis information.

Action module 166 may include various hardware and software components that determine an appropriate action in response to the analyzed player data. In response to a strong indication of player identity compromise, the system may close the game and alert a fraud prevention team. If there is a moderate likelihood that the player is fraudulent, the system may be on high alert and perform a more detailed analysis of the data and/or close observation of the player. Other less alarming activity may flag the player for continued supervision.

Also, some types of fraudsters may be inclined to cheat a game in groups where a group of players work together to cheat a game. The system of the present invention may observe players who are collaborating together on numerous games or instances and analyze player data for potential group fraud. Also, if one player is identified as a fraudster, the other associated players may be monitored or flagged for close supervision.

Figure 2:
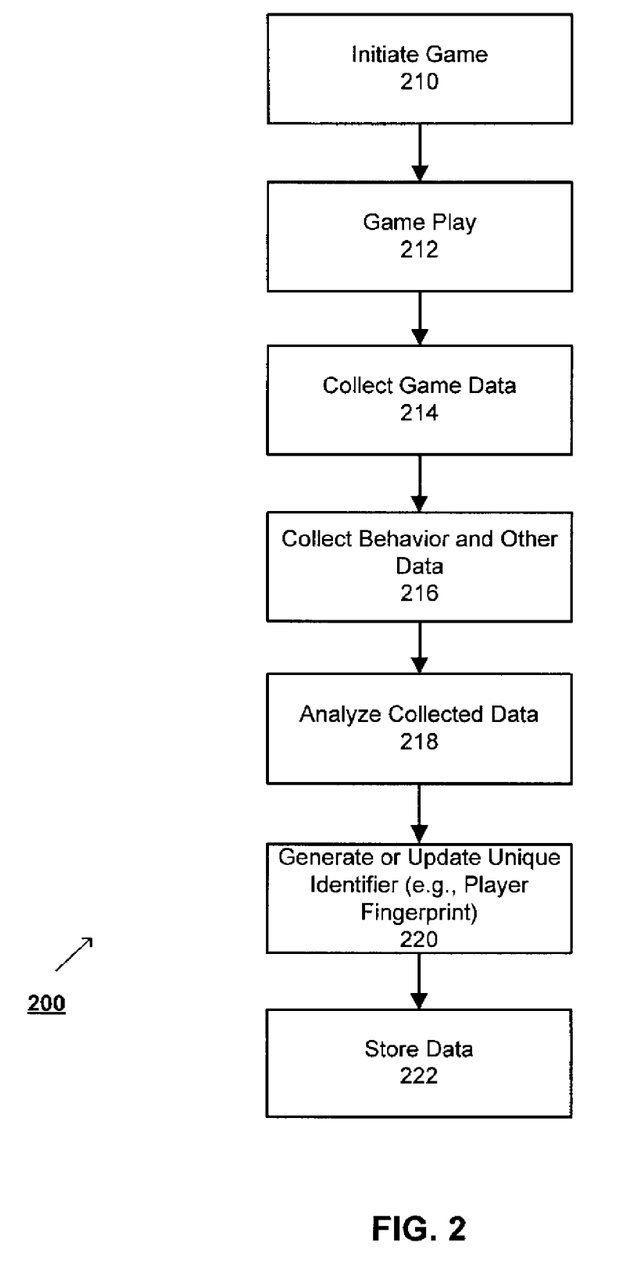
FIG. 2 is an exemplary flowchart of a method for uniquely identifying a player in accordance with an exemplary embodiment.

FIG. 2 is an exemplary flowchart of a method for uniquely identifying a player in accordance with an exemplary embodiment. Method 200 is provided by way of example, as there are a variety of ways to carry out the methods disclosed herein. Method 200 as shown in FIG. 2 may be executed or otherwise performed by one or a combination of various systems, such as a computer implemented system described in FIG. 1. At step 210, a game may be initiated by a player. At step 212, the player may engage in the game. At step 214, player game data may be collected. At step 216, other types of data may be collected. This data may be related to the game or independent of the game. At step 218, the collected data may be analyzed. At step 220, a unique identifier (or player fingerprint) may be generated and/or updated by the system. At step 222, the collected data may be stored. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a game may be initiated by a player. The game may be of any type or genre. For example, the game may be an online game or a game running on a local PC or mobile device associated with a player. The game executable file may be resident on a local computer or on a remote server. For example, the game may involve a client-server set-up whereby the player is using a client computer which is in communication with a server computer. The server may be remotely located from the client computer.

The game may involve one or more players. For example, the game may be a single player game or a multi-player game. As part of the commencement of the game, the game may identify the player(s) involved and assess whether behavior data exists. If no such data exists, then the game may perform the method 200 to establish such data. In the case of such data existing, the method 200 may be performed to update the data and also the method 300, described below, may be performed.

At step 212, the player may engage in the game. The gameplay may involve the player(s) interacting with the gaming environment by performing various actions such as movement, shooting, solving puzzles, and/or communicating with other players. The player may engage in multiple games simultaneously.

At step 214, game player data may be collected. The data may be collected during the gameplay where the data collected may indicate how a player interacts with the game and/or other players. For example, data may be collected during the gameplay relating to target acquisition patterns, time from on-screen to reaction, pattern of mouse honing in to target, pattern of body part being targeted, fire pattern, time between bursts, offset from target when first shot is fired, movement pattern, interplay of rotation and movement, rarely moving backwards or looking up, location pattern, hugging walls vs. not, taking the same route through a level, jump start point, time to orient after re-spawn, interaction with other players/VoIP usage. This list is meant to be exemplary and non-limiting as there as other behaviors that may be observed. Data may be collected every time a player performs one or more of the listed behaviors. For example, every time a player fires a weapon, the targeting data or type of weapon used may be collected. Also, data may be collected at time or event intervals.

The data may be collected by the game executable. The data may be locally collected. In other embodiments, the data may be collected on a server side such as in online games or in client-server games. In some embodiments, while the game may be locally played, the data may be remotely collected through a connection to a computer based network, such as the Internet, during gameplay. The data may be stored in a temporary cache, such as in memory or on a storage drive, during this process.

At step 216, other types of data may be collected. This data may be related to the game or independent of the game. Other types of data may include behavior data, location data, demographic data, transactional data, purchase data, activity data, social network data, etc. Data may also include information from other games and even other game providers. In the example involving multiple game providers, a consortium of game providers may be formed to share player information. Transaction and purchase information may be obtained from merchants, retailers, service providers, etc. This information may be used to supplement the unique player identification. Also, this information may be used for targeted information that may be related or not to the game, as well as targeted marketing and informational messages.

At step 218, the collected data may be analyzed. The collected data may be processed after a predetermined amount of data is collected. For example, an embodiment of the present invention may analyze the data to determine if one or more patterns are present. The collected data may also be analyzed to determine risk and/or likelihood of fraud or other undesirable behavior.

At step 220, a unique identifier (or player fingerprint) may be generated and/or updated by the system. With each game or interaction, the unique identifier may be updated. For example, as the player becomes better at the game, his or her unique identifier may be updated. The system may also recognize how quickly the player improves and even suggest other games with a high difficulty level that the player would likely enjoy.

At step 222, the collected data may be stored. The processed data may be stored in a database. The processed data may be locally or remotely stored. In the case of the game being installed on a local computer, the data may be locally stored in a secure folder/partition associated with the game. The data may be associated with a login or username for the player with which it is associated.

At block 212, the game ends. The game may end when the players quits the game. Also, data may be continued to be collected from the current game even when the player exits the game. The data may be collected on the game and/or other players in the game.

Figure 3:
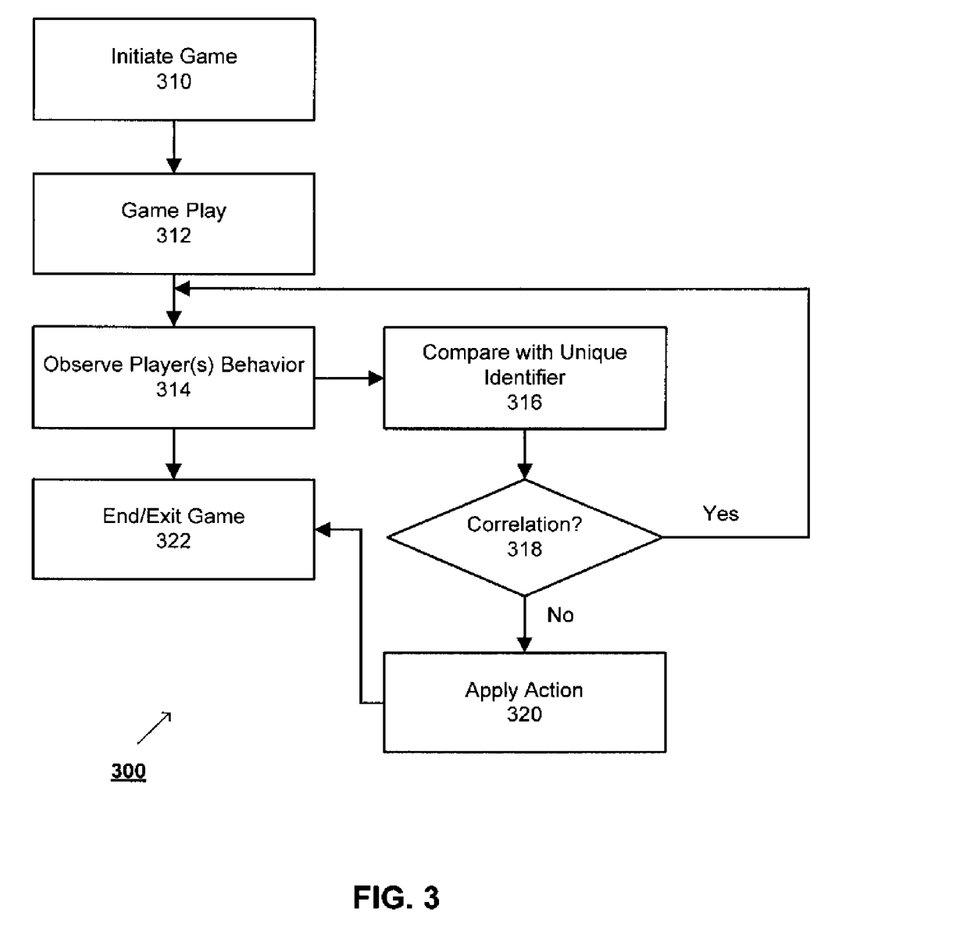
FIG. 3 is an exemplary flowchart of a method for authenticating a player in accordance with an exemplary embodiment.

FIG. 3 is an exemplary flowchart of a method for authenticating a player in accordance with an exemplary embodiment. Exemplary method 300 is provided by way of example, as there are a variety of ways to carry out the methods disclosed herein. The method 300 as shown in FIG. 3 may be executed or otherwise performed by one or a combination of various systems, such as the exemplary system illustrated in FIG. 1. The method 300 may be executed in parallel with the method 200 described above. For example, while player data is being collected, the player's identify may be authenticated or verified. In this manner, the game may be constantly observing the player's behavior and collecting data. At step 310, a game may be initiated or joined. At step 312, the player may engage in game play. At step 314, the player's behavior may be observed. At step 316, the observed data may be compared with the unique identifier (e.g., player fingerprint). At step 318, a correlation may be determined. In response to the correlation, an action may be taken at step 320. At step 322, the game may end for the player. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, a game may be initiated or joined. As noted above, the game may be of any type or genre, which may include an online game or a game running on a local PC or mobile device associated with a player. The game may a single player game or a multi-player game.

At step 312, the player may engage in game play. The gameplay may involve the player(s) interacting with the gaming environment by performing various actions such as movement, shooting, solving puzzles, and/or communicating with other players.

At step 314, the player's behavior may be observed. As the player plays the game, the player's interactions with the game and/or other players may be observed and collected. The observed data may include target acquisition patterns, fire patterns, movement patterns, location patterns, timing patterns, and/or other player interactions.

At step 316, the observed data may be compared with the unique identifier (e.g., player fingerprint). The observed data may be analyzed to verify the player's identity. For example, if the player is playing at a much higher proficiency level since the last game (or short time duration), the system may recognize that the player is someone else. If the player is playing at a very high precision within discrete short timed intervals, this may be behavior indicative of a bot or other computer assisted play. If the player is playing for an extended period of time, with changes in behavior, this may indicate that multiple players are playing as the same person.

At step 318, a correlation may be determined. For example, an evaluation may be made based on a level of correlation or matching between the observed behavior and the stored data. If the correlation match is at a high level, then the game play continues. The correlation may be required to be above a certain percentage to be deemed high enough to be a match. For example, a 90% correlation may be required. The correlation level may be recalibrated as the system learns the player's behavior and achieves accurate player authentication.

If the correlation does not match or is low, the method may continue to block 312 for continued observation. The correlation may be required to be below a certain percentage to be deemed low enough to not be a match. For example, a 25% correlation may be required.

Moderate correlation (e.g., between 26% and 89%) may be divided into smaller subsets with corresponding levels of response. Other methods of determining a correlation or match may be used (e.g., numeric value, grade system, color code, levels, etc.). For example, a correlation near 85% may result in continued gameplay whereas a correlation near 30% may involve a warning message and close supervision of the player. A correlation near 50% may result in the system initiating an addition level of observation and/or determining other areas of match (e.g., behavior data, location data, etc.). In addition, the player may be placed on a watch list for further supervision and analysis.

In response to level or degree of correlation, an appropriate action may be taken at step 320. The action taken may include, for example, suspension of gameplay, deactivation of a character or item, a notification message on the screen, an email or other communication to the player's account, an in-game penalty such as loss of points, items, or spawning of unbeatable opponents to impact the player's gaming experience. These examples are meant to be exemplary and non-limiting.

According to another example, an embodiment of the present invention may apply profiles to identify a particular type of fraud. For example, the system may use historical data for known fraudulent events and generate profiles or templates based on that activity. A cheater profile may be applied to a particular player to see how likely they are to be engaging in cheating activity. Likewise, an account hacker profile may be applied to determine likelihood of fraud.

At step 322, the game may end for the player.

It should be appreciated that the methods 200 and 300 may apply to one specific game and that the player fingerprint may be game specific. In some embodiments, the player fingerprint may be applicable across two or more games with similar structure or requirements. Thus, data collected on a player in one game may be applied in a second (or multiple) games to identify the behavior.

It is to be appreciated that the set of instructions, e.g., the software that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A computer implemented method, comprising:
   identifying, by at least one computer processor, a unique player identifier for at least one player of a computer game;
   collecting, by the at least one computer processor, game behavior data relating to behavior of at least one player during the computer game, the game behavior data comprising how a player interacts with an environment of the computer game during player engagement with the computer game;
   performing, by the at least one computer processor, a comparison between the unique player identifier and the game behavior data during the computer game;
   identifying, by the at least one computer processor, a correlation level based at least in part on the comparison between the unique player identifier and the game behavior data such that if the correlation level is above a predetermined level, the correlation level is deemed a match to the unique player identifier, and if the correlation level is below a predetermined level, the correlation level is deemed not a match to the unique player identifier;

verifying, by the at least one computer processor, a player's identity based at least in part on the comparison; and providing, by the at least one computer processor, a recommended action.

2. The method of claim 1, wherein the game behavior data comprises one or more of: target acquisition pattern, fire pattern, movement pattern, location pattern and timing pattern.

3. The method of claim 1, further comprising the step of:
collecting, by the at least one computer processor, player demographic data, wherein the player demographic data is used to update the unique player identifier.

4. The method of claim 1, further comprising the step of:
collecting, by the at least one computer processor, player social network data from one or more social network websites, wherein the player social network data is used to update the unique player identifier.

5. The method of claim 1, further comprising the step of:
collecting, by the at least one computer processor, player transactional data from one or more merchants, wherein the player transactional data is used to update the unique player identifier.

6. The method of claim 1, wherein the recommended action is responsive to the correlation level.

7. The method of claim 6, wherein the recommended action is one or more of: continued game play, suspension of game, deactivation of a character or item, a notification message, and in-game penalty.

8. The method of claim 1, wherein the collected game play data is used to update the unique player identifier.

9. The system of claim 1, wherein the processor further performs the step of:
collecting player transactional data from one or more merchants, wherein the player transactional data is used to update the unique player identifier.

10. The system of claim 1, wherein the collected game play data is used to update the unique player identifier.

11. A system, comprising:
a processor; and
a memory comprising computer-readable instructions which when executed by the processor cause the processor to perform the steps comprising:

identifying a unique player identifier for at least one player of a computer game;

collecting game behavior data relating to behavior of at least one player during the computer game, the game behavior data comprising how the at least one player interacts with an environment of the computer game during engagement of the at least one player with the computer game;

performing a comparison between the unique player identifier and the game behavior data during the computer game;

identifying a correlation level based at least in part on the comparison between the unique player identifier and the game behavior data such that if the correlation level is above a predetermined level, the correlation level is deemed a match to the unique player identifier, and if the correlation level is below a predetermined level, the correlation level is deemed not a match to the unique player identifier;

verifying a player's identity based at least in part on the comparison; and providing a recommended action.

12. The system of claim 11, wherein the game behavior data comprises one or more of: target acquisition pattern, fire pattern, movement pattern, location pattern and timing pattern.

13. The system of claim 11, wherein the processor further performs the step of:
collecting player demographic data, wherein the player demographic data is used to update the unique player identifier.

14. The system of claim 11, wherein the processor further performs the step of:
collecting player social network data from one or more social network websites, wherein the player social network data is used to update the unique player identifier.

15. The system of claim 11, wherein the recommended action is responsive to the correlation level.

16. The system of claim 15, wherein the recommended action is one or more of: continued game play, suspension of game, deactivation of a character or item, a notification message, and in-game penalty.

* * * * *